US009667997B2

(12) United States Patent
An et al.

(10) Patent No.: US 9,667,997 B2
(45) Date of Patent: May 30, 2017

(54) METHOD AND APPARATUS FOR INTRA TRANSFORM SKIP MODE

(71) Applicant: HFI INNOVATION INC., Zhubei, Hsinchu County (TW)

(72) Inventors: Jicheng An, Beijing (CN); Liang Zhao, Beijing (CN); Xun Guo, Beijing (CN); Shaw-Min Lei, Hsinchu County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 211 days.

(21) Appl. No.: 14/403,189

(22) PCT Filed: May 7, 2013

(86) PCT No.: PCT/CN2013/075237
§ 371 (c)(1),
(2) Date: Nov. 23, 2014

(87) PCT Pub. No.: WO2013/181979
PCT Pub. Date: Dec. 12, 2013

(65) Prior Publication Data
US 2015/0110180 A1 Apr. 23, 2015

(30) Foreign Application Priority Data
Jun. 7, 2012 (CN) .................. PCT/CN2012/076581

(51) Int. Cl.
*H04N 9/47* (2006.01)
*H04N 19/61* (2014.01)
*H04N 19/159* (2014.01)
*H04N 19/176* (2014.01)
(Continued)

(52) U.S. Cl.
CPC ............. *H04N 19/61* (2014.11); *H04N 19/12* (2014.11); *H04N 19/127* (2014.11);
(Continued)

(58) Field of Classification Search
IPC ....................................................... H04N 19/61
See application file for complete search history.

(56) References Cited

U.S. PATENT DOCUMENTS

| 2010/0061447 | A1 | 3/2010 | Tu et al. |
| 2010/0189180 | A1* | 7/2010 | Narroschke .......... H04N 19/147 375/240.16 |

(Continued)

FOREIGN PATENT DOCUMENTS

| CN | 101159873 A | 4/2008 |
| KR | 10201000261658 | 2/2010 |
| WO | WO 2008/157268 | 12/2008 |

OTHER PUBLICATIONS

Lan, C., et al.; "Intra transform skipping;" Joint Collaborative Team on Video Coding (JCT-VC) of ITU-T SH 16 WP 3 and ISO/IEC JTC 1/SC29/WG 11; Apr.-May 2012; pp. 1-11.
(Continued)

*Primary Examiner* — Tracy Y Li
(74) *Attorney, Agent, or Firm* — McClure, Qualey & Rodack, LLP (57) ABSTRACT

A method and apparatus for video coding including an Intra transform Skip mode is disclosed. When the transform Skip mode is ON for a transform unit, embodiments according to the present invention apply different coding processes to the transform unit. The coding process with the transform Skip mode ON uses a different scan pattern from the coding process with the transform Skip mode OFF. According to various embodiments, the transform Skip mode is enabled when the transform unit size is 4×4, the prediction unit and the transform unit having the same size, or the prediction unit uses an INTRA_N×N mode. When the transform Skip mode is enabled, a flag can be signaled in the bitstream to indicate the transform Skip mode selection. Furthermore, the flag can be incorporated in a picture level, a slice level or a sequence level of the video bitstream.

18 Claims, 5 Drawing Sheets

(51) Int. Cl.
  *H04N 19/70* (2014.01)
  *H04N 19/12* (2014.01)
  *H04N 19/127* (2014.01)
  *H04N 19/44* (2014.01)
  *H04N 19/91* (2014.01)

(52) U.S. Cl.
  CPC ......... *H04N 19/159* (2014.11); *H04N 19/176* (2014.11); *H04N 19/44* (2014.11); *H04N 19/70* (2014.11); *H04N 19/91* (2014.11)

(56) References Cited

U.S. PATENT DOCUMENTS

| | | |
|---|---|---|
| 2011/0007820 A1 | 1/2011 | Yim |
| 2011/0310976 A1 | 12/2011 | Wang et al. |
| 2013/0003824 A1* | 1/2013 | Guo .................... H04N 19/176 375/240.03 |

OTHER PUBLICATIONS

Mrak, M., et al.; "Transform skip mode;" Joint Collaborative Team on Video Coding (JCT-VC) of ITU-T SG16 WP3 and ISO/IEC JTC1/SC29/WG11; Jul. 2011; pp. 1-10.

Mrak, M., et al.; "Mode-dependent significance scans for transform skip;" Joint Collaborative Team on Video Coding (JCT-VC) of ITU-T SG16 WP3 and ISO/IEC JTC1/SC29/WG11; Feb. 2012; pp. 1-4.

Joshi, R.L., et al.; "CE5: Subtest d: Modifications to last significant coefficient position coding for transform skip mode;" Joint Collaborative Team on Video Coding (JCT-VC) of ITU-T SG16 WP3 and ISO/IEC JTC1/SC29/WG11; Feb. 2012; pp. 1-4.

An., J., et al.; "Residue scan for intra transform skip mode;" Joint Collaborative Team on Video Coding (JCT-VC) of ITU-T SG16 WP3 and ISO/IEC JTC1/SC29/WG11; Jul. 2012; pp. 1-6.

* cited by examiner

METHOD AND APPARATUS FOR INTRA TRANSFORM SKIP MODE

CROSS REFERENCE TO RELATED APPLICATIONS

The present invention claims priority to PCT Patent Application, Ser. No. PCT/CN2012/076581, filed Jun. 7, 2012, entitled "Improved Intra Transform Skip". The PCT Patent Applications is hereby incorporated by reference in its entirety.

FIELD OF INVENTION

The present invention relates to video coding system. In particular, the present invention relates to method and apparatus for video coding system incorporating a transform Skip mode for Intra-predicted transform unit.

BACKGROUND OF THE INVENTION

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

Figure 1A:
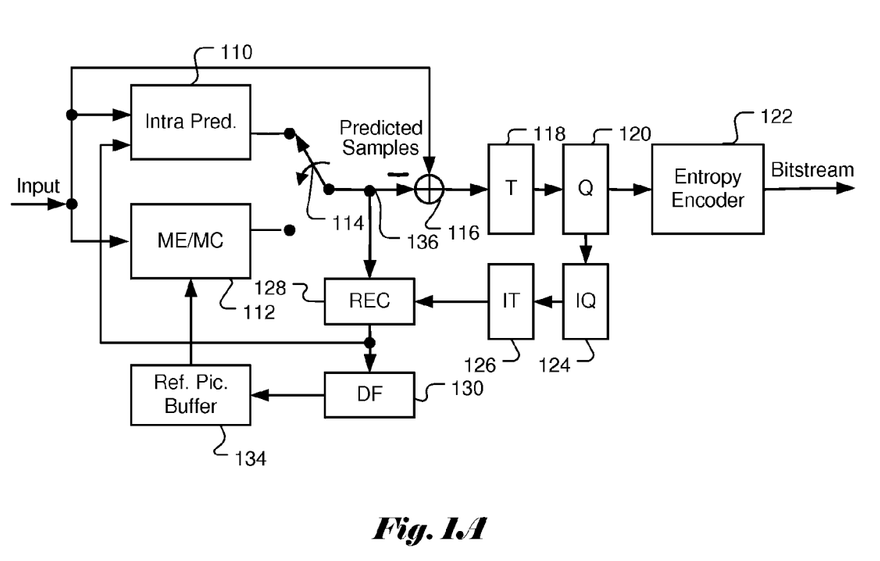
FIG. 1A illustrates an exemplary adaptive inter/intra video encoder system.

FIG. 1A illustrates an exemplary system block diagram for an video encoder using adaptive Inter/Intra prediction. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130 has been developed to enhance picture quality. The in-loop filter information may have to be incorporated in the bitstream so that a decoder can properly recover the required information.

Figure 1B:
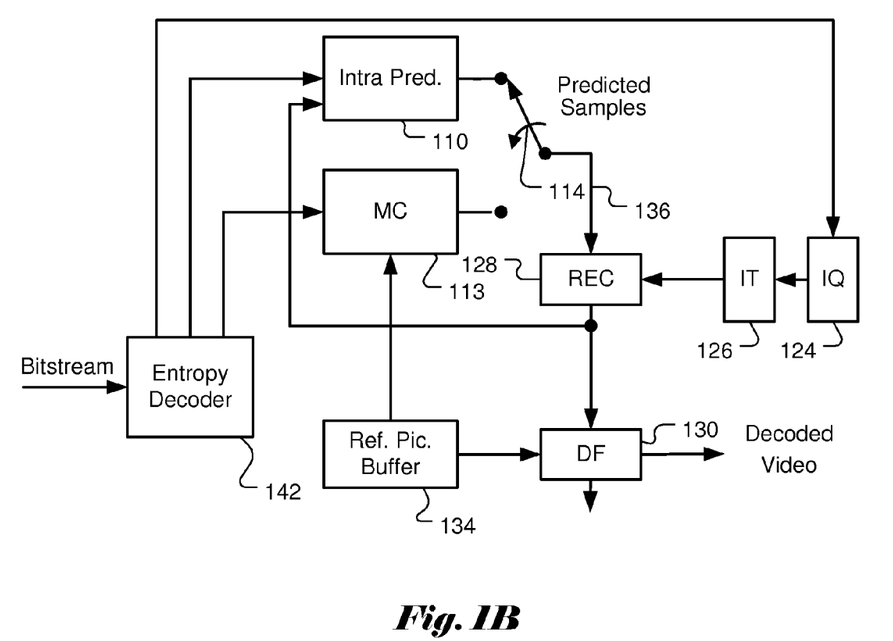
FIG. 1B illustrates an exemplary adaptive inter/intra video decoder system.

A corresponding decoder for the encoder of FIG. 1A is shown in FIG. 1B. The video bitstream is decoded by Video Decoder 142 to recover the transformed and quantized residues and other system information. At the decoder side, only Motion Compensation (MC) 113 is performed instead of ME/MC. The decoding process is similar to the reconstruction loop at the encoder side. The recovered transformed and quantized residues and other system information are used to reconstruct the video data. The reconstructed video is further processed by DF 130 to produce the final enhanced decoded video.

In the High Efficiency Video Coding (HEVC) standard, three block concepts are introduced, i.e., coding unit (CU), prediction unit (PU), and transform unit (TU). The overall coding structure is characterized by the various sizes of CU, PU and TU. Each picture is divided into largest CUs (LCUs) or Coding Tree Blocks (CTBs). Each LCU is then recursively divided into smaller CUs until leaf CUs or smallest CUs are reached. After the CU hierarchical tree is done, Inter or Intra prediction is applied to prediction units (PUs) according to partition type. Each PU may be partitioned into one or more smaller blocks (i.e., PUs), such as 2N×2N, 2N×N, N×2N and N×N. Asymmetric partition for prediction units is also allowed. Residues are formed for each PU after applying Inter or Intra prediction. Furthermore, residues are partitioned into transform units (TUs) and two-dimensional transform is applied to the residue data to convert the spatial data into transform coefficients for compact data representation.

The adaptive Inter/Intra prediction shown in FIGS. 1A-B has been widely used in various coding standards. As mentioned above, the residues from the adaptive Inter/Intra prediction are further processed by a two-dimensional transform to exploit the remaining redundancy within the residues. Nevertheless, for some residue data, the two-dimensional transform may not help to improve compression efficiency. An Intra transform skipping scheme is disclosed by Lan et al. for a 4×4 transform unit ("Intra transform skipping", Joint Collaborative Team on Video Coding (JCT-VC) of ITU-T SG 16 WP 3 and ISO/IEC JTC 1/SC 29/WG 11, 9th Meeting: Geneva, CH, 27 Apr.-7 May 2012, Document: JCTVC-I0408). The transform Skip mode for a 4×4 Intra TU by Lan et al. uses the same Intra prediction to form Intra prediction residues. When the transform Skip mode is selected for an underlying block (i.e., 4×4 TU), two-dimensional transform is skipped (i.e., bypassed) for the underlying block on the encoder side. Accordingly, the inverse transform is skipped for the underlying block. Furthermore, the same dequantization process is used as if the block was inverse transformed. In order to use the same dequantization process, the inverse transform-skipped block is scaled down by a factor of 32 for the 4×4 TU. A flag for each 4×4 intra TU is sent to indicate if transform is bypassed or not. Two contexts are added to code the flag for Y, U and V TUs. Another flag in the SPS (Sequence Parameter Set) is used to indicate whether transform skipping is enabled or not.

While the transform Skip mode by Lan et al. demonstrates some performance improvement over a conventional coding system that doesn't support transform skipping, it is desirable to further improve the performance by taking into account the characteristics of the Intra prediction residues.

SUMMARY OF THE INVENTION

A method and apparatus for video coding including an Intra transform Skip mode is disclosed. When the transform Skip mode is ON for a transform unit, embodiments according to the present invention applies different coding process to the transform unit from the coding process for a transform unit with the transform Skip mode OFF. The coding process with the transform Skip mode ON uses a different scan pattern than the coding process with the transform Skip mode OFF. In one embodiment, the transform Skip mode is enabled for the transform unit (TU) size of 4×4. In another embodiment, the transform Skip mode is enabled for the prediction unit (PU) and the transform unit (TU) having the same size. In yet another embodiment, the transform Skip mode is enabled for the prediction unit (PU) using an INTRA_N×N mode. When the transform Skip mode is enabled, a flag can be signaled in the bitstream to indicate whether the transform Skip mode is ON or OFF. Furthermore, the flag can be incorporated in a picture level, a slice level or a sequence level of the video bitstream.

DETAILED DESCRIPTION

Figure 2:
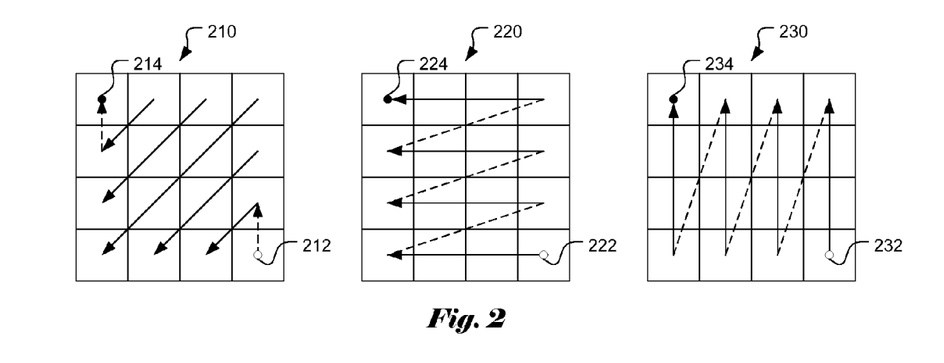
FIG. 2 illustrates scan patterns for a 4×4 transform unit according to the High Efficiency Video Coding (HEVC) standard.

In a video coding system, two dimensional transform is often applied to residues from Inter/Intra prediction to exploit the redundancy within the residue data. The two-dimensional transform coefficients are converted to one-dimensional data using a selected scan pattern. The one-dimensional transform data is processed by quantization to generate symbols to be compressed by entropy coding. The scan pattern is designed to conveniently convert the two-dimensional data into one-dimensional data and also to achieve good compression performance for the subsequent entropy coding. In the HEVC (High Efficiency Video Coding) system, three scan patterns are used for 4×4 and 8×8 TUs as shown in FIG. 2, where scan pattern 210 corresponds to diagonal scan in the direction from upper right to lower left, scan pattern 220 corresponds to horizontal scan from right to left, and scan pattern 230 corresponds to vertical scan from bottom to top. The scan patterns start from locations indicated by open circles (212, 222, and 232) and end at locations indicated by solid circles (214, 224 and 234). In the transform domain, the energy usually concentrates in the lower frequency region. The scan patterns (i.e., 210, 220 and 230) in FIG. 2 scan from a lower energy region to a higher energy region. The subsequent entropy coding is designed according to the statistics of the scanned-quantized coefficients.

Figure 3:
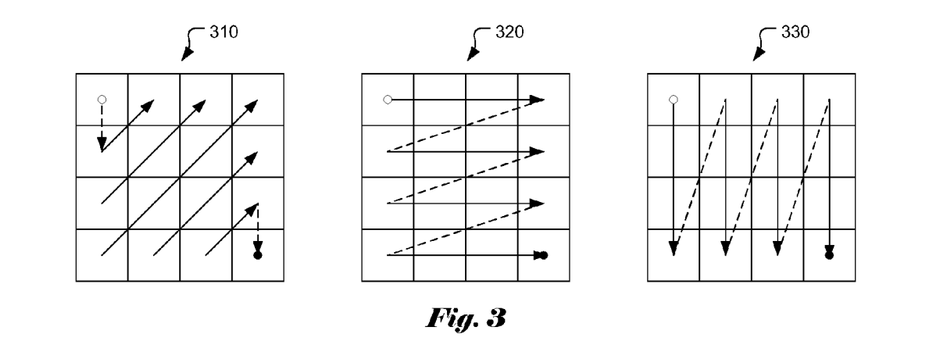
FIG. 3 illustrates scan patterns for a 4×4 transform unit when the transform Skip mode is ON according to an embodiment of the present invention.

Embodiments according to the present invention use different scan patterns from the conventional scan patterns for a block with the transform Skip mode ON. It is observed that the characteristics of the residue data are different from the transform coefficients. If the same scan patterns for transform coefficients are applied to the residue data, the resulting scanned-quantized data may have high entropy. Furthermore, the resulting scanned-quantized data may not fit into the statistical model that the entropy coding is designed for. For example, when the intra prediction mode uses the diagonal scan, the diagonal scan pattern (210) will be applied to the prediction residual when the transform Skip mode is OFF according to the conventional approach. When the underlying block is two-dimensional transformed, the energy will be concentrated at the upper left corner (i.e., the corner corresponding to lower spatial frequencies). The diagonal scan pattern (210) will likely cause longer zero-runs and result in lower entropy. Nevertheless, for the Intra prediction residues, the residue data usually is larger at the lower right corner and decreases along the direction from lower right to upper left. The larger Intra prediction residues at the lower right corner is mostly due to the longer prediction distance since Intra prediction is based on neighbor pixels adjacent to the top block boundary and the left block boundary. The low-to-high energy distribution for the Intra prediction residues is from upper left corner to the lower right corner. On the other hand, the low-to-high energy distribution for the transform coefficients is from the lower right corner to the upper left corner of the transform unit. In other words, the energy distributions between the transform coefficients and the Intra prediction residues are reversed. Accordingly, an embodiment according to the present invention uses a reverse diagonal scan pattern for the transform unit when the transform Skip mode is ON for an underlying transform unit. The normal diagonal scan pattern (i.e., scan pattern 210) would have been applied to the transform unit if the transform Skip mode were OFF for the transform unit. A reverse diagonal scan pattern (310) corresponding to the diagonal scan pattern (210) is shown in FIG. 3.

When transform Skip mode is ON and the Intra prediction mode uses horizontal scan, the prediction residues usually are larger at the bottom region and decrease toward the top of the transform unit since the prediction distance is larger for the bottom region. Therefore, the energy distribution for the Intra prediction residues with the transform Skip mode ON is reversed compared to the two-dimensional transform coefficients when the transform Skip mode is OFF. Therefore, in another embodiment of the present invention, inversed horizontal scan 320 is used as shown in FIG. 3 when transform Skip mode is ON for an underlying transform unit. The underlying transform unit would have used normal horizontal scan pattern 220 if the transform Skip mode were OFF for the transform unit.

When transform Skip mode is ON and the Intra prediction mode uses vertical scan, the prediction residues usually are larger at the right region and decrease toward the left boundary of the block since the prediction distance is larger for the right region. Therefore, the energy distribution for the transform unit with the transform Skip mode ON is reversed compared to the two-dimensional transform coefficients with the transform Skip mode OFF. In another embodiment of the present invention, reversed vertical scan 330 is used as shown in FIG. 3 when the transform Skip mode is ON. The underlying transform unit would have used normal vertical scan pattern 230 if the transform Skip mode were OFF for the transform unit.

As shown above, embodiments according the present invention use reversed diagonal, horizontal and vertical scans when the transform Skip mode is ON. One way to implement the reversed scan patterns is to add the reversed scan patterns as additional scan patterns to the conventional scan patterns. Accordingly, there will be six scan patterns for a system with transform Skip mode enabled. An alternative way to implement the reversed scan order is to store the Intra prediction residues associated with the transform unit in a reversed order. Usually in a system using block-based processing, a block from a current processing stage is buffered for the next stage processing. The processing stage may correspond to transform, scan conversion or quantization on the encoding side, or inverse transform, inverse scan conversion or dequantization on the decoding side. Therefore, the Intra prediction residues can be stored in a reversed scan order if the transform Skip mode is ON for the block. Accordingly, regular scan pattern can be applied to the block stored in the reversed order as if it were a transformed block.

An exemplary pseudo codes to implement a reverse diagonal scan is shown as follows:

Original diagonal scan: $r_{ij} = (d_{ij} + (1 << (\text{shift} - 1))) >> \text{shift}$ (1)

Reverse diagonal scan: $r_{ij} = (d_{(nW-1-i)(nH-1-j)} + (\text{shift} - 1))) >> \text{shift}$ (2)

In equations (1) and (2), scaling the residue is achieved using shifting by a specified factor, where $d_{ij}$ is the residue before scaling and $r_{ij}$ is the scaled residue. If a scaling factor of 32 is desired, the scaling can be implemented by right shifting by 5 bits, i.e., shift=5. For the reverse scan, the indices of the residue before scaling is mapped to the indices of the residue to be stored according to $(nW-1-i)(nH-1-j) => ij$, where nW is the block width and nH is the block height.

In another embodiment, the transform Skip mode is constrained in order to reduce complexity as well as to save some bits. For example, the transform Skip mode is enabled only when the PU and TU are the same. In this case, the PU and TU are associated with the same video data. This is also equivalent to the PU and TU having the same size. Other conditions for enabling transform Skip mode include the case that the TU size is 4×4 and the case that the partition mode is Intra_N×N. A flag to signal the transform Skip mode is transmitted only when the transform Skip mode is enabled. The flag can be incorporated in the sequence level (e.g., Sequence Parameter Set, SPS), the picture level (e.g., Picture Parameter Set, PPS) or the slice level of the bitstream.

Figure 4:
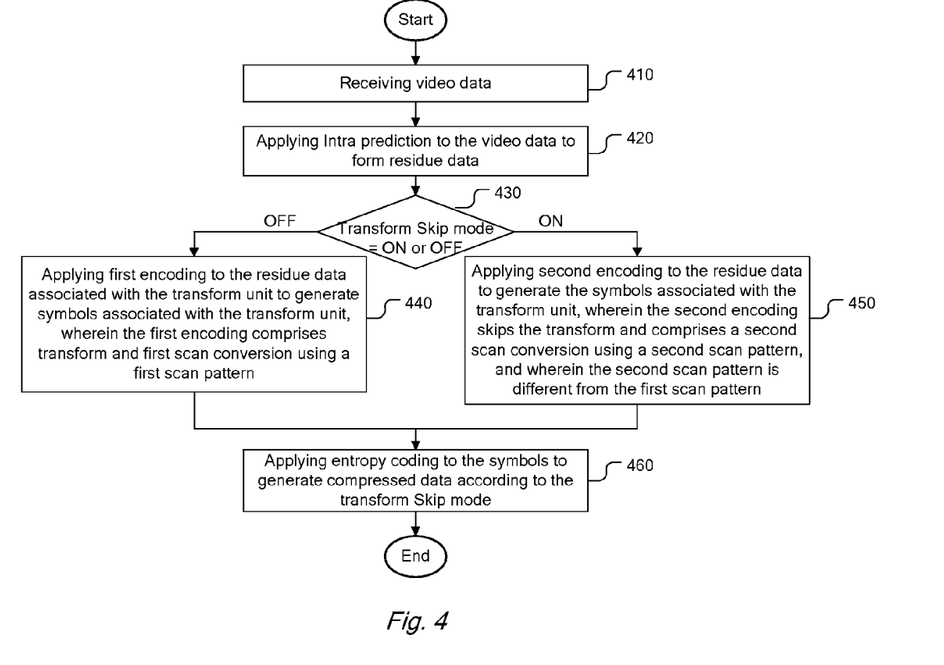
FIG. 4 illustrates a flowchart for an exemplary video encoding system incorporating a transform Skip mode according to an embodiment of the present invention.

FIG. 4 illustrates an exemplary flowchart of an encoding system incorporating a transform Skip mode according to an embodiment of the present invention. The system receives video data to be encoded as shown in step 410. The video data may be received from storage such as a computer memory, buffer (RAM or DRAM) or other media. The encoding system illustrated in FIG. 4 may be implemented in hardware, software, or both hardware and software. In a software based implementation, the video data may be stored in a data space allocated by a program or a subroutine for the video encoder. The video data may also be received from a processor such as a controller, a central processing unit, a digital signal processor or electronic circuits that produce the video data. The processor may perform some processing to prepare the input video data for the encoding system. For example, the original video data may be in a raw RGB format and is converted to a luminance/chrominance format for subsequent encoding process. The processor may also perform noise reduction to improve coding efficiency. Other types of processing may also be performed to prepare the video data for subsequent coding. Intra prediction is then applied to the video data to form residue data as shown in step 420. A decision is performed in step 430 regarding whether the transform Skip mode is ON or OFF for a transform unit. If the transform Skip mode is OFF, a first encoding process is applied to the residue data associated with the transform unit to generate symbols associated with the transform unit as shown in step 440, wherein the first encoding process comprises transform and first scan conversion using a first scan pattern. If the transform Skip mode is ON, a second encoding process is applied to the residue data to generate the symbols associated with the transform unit as shown in step 450, wherein the second encoding process skips the transform and comprises a second scan conversion using a second scan pattern, and wherein the second scan pattern is different from the first scan pattern. Entropy coding is then applied to the symbols to generate compressed data as shown in step 460.

Figure 5:
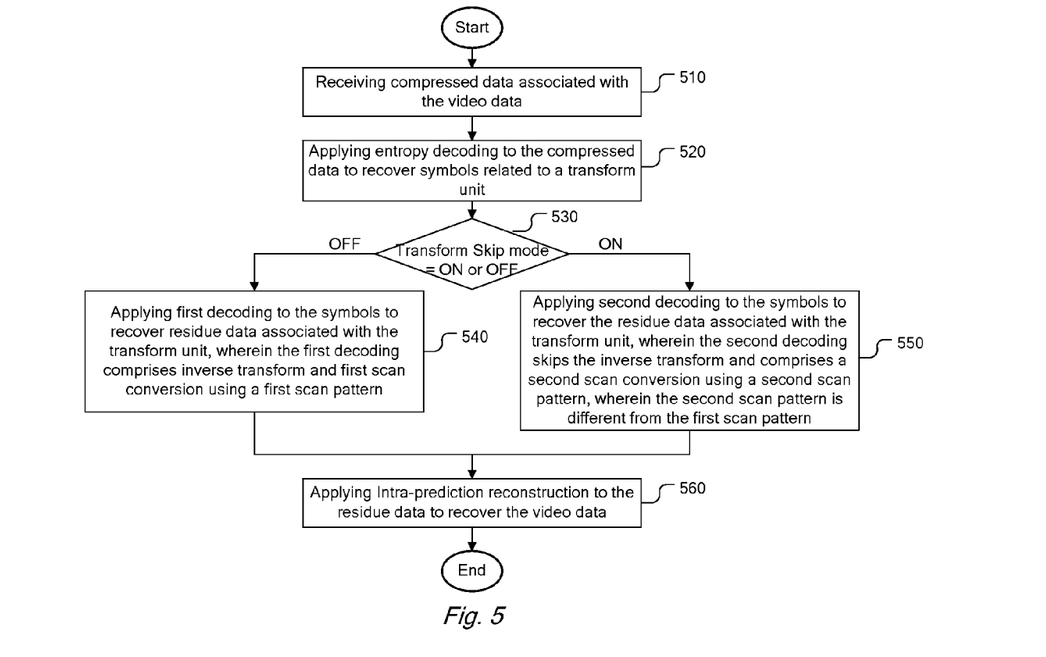
FIG. 5 illustrates a flowchart for an exemplary video decoding system incorporating a transform Skip mode according to an embodiment of the present invention.

FIG. 5 illustrates an exemplary flowchart of a decoding system incorporating a transform Skip mode according to an embodiment of the present invention. The system receives compressed data associated with the video data as shown in step 510. The compressed data may be received from storage such as a computer memory, buffer (RAM or DRAM) or other media. The decoding system illustrated in FIG. 5 may be implemented in hardware, software, or both hardware and software. In a software based implementation, the compressed data may be stored in a data space allocated by a program or a subroutine associated with the video decoder. The compressed data may also be received from a processor such as a controller, a central processing unit, a digital signal processor or electronic circuits that produce the first data. The processor may perform some processing to prepare the compressed data for the decoding system. For example, the compressed data may be extracted from a multiplexed media stream corresponding to multiple audio/video channels. The processor may receive the compressed data from a transmission channel or through internet. The processor may also perform error correction on the compressed data if the compressed data is susceptible to transmission errors. Other type of processing may also be performed to prepare the compressed data for subsequent decoding. Entropy decoding is applied to the compressed data to recover symbols related to a transform unit as shown in step 520. A decision is performed in step 530 regarding whether the transform Skip mode is ON or OFF for a transform unit. If the transform Skip mode is OFF, a first decoding process is applied to the symbols to recover residue data associated with the transform unit as shown in step 540, wherein the first decoding process comprises inverse transform and first scan conversion using a first scan pattern. If the transform Skip mode is ON, a second decoding process is applied to the symbols to recover the residue data associated with the transform unit, wherein the second decoding process skips the inverse transform and comprises a second scan conversion using a second scan pattern as shown in step 550, wherein the second scan pattern is different from the first scan pattern. Intra-prediction reconstruction is then applied to the residue data to recover the video data as shown in step 560.

The flowcharts shown above are intended to illustrate exemplary encoder and decoder incorporating a transform Skip mode incorporating an embodiment of the present invention. A person skilled in the art may modify each step, re-arrange the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding video data, the method comprising:
   receiving compressed data associated with the video data;
   applying entropy decoding to the compressed data to recover symbols related to a transform unit (TU);
   if transform Skip mode is OFF for the transform unit, applying a first decoding process to the symbols to recover residue data associated with the transform unit, wherein the first decoding process comprises inverse transform and first scan conversion using a first scan pattern;
   if the transform Skip mode is ON for the transform unit, applying a second decoding process to the symbols to recover the residue data associated with the transform unit, wherein the second decoding process skips the inverse transform and comprises a second scan conversion using a second scan pattern, and wherein the second scan pattern is different from the first scan pattern; and
   applying Intra-prediction reconstruction to the residue data to recover the video data.

2. The method of claim 1, wherein said applying the second decoding process comprises storing the residue data according to the second scan pattern before said applying Intra-prediction reconstruction to the residue data.

3. The method of claim 1, wherein the second scan pattern corresponds to a reverse scan of the first scan pattern.

4. The method of claim 1, wherein the transform unit corresponds to a 4×4 TU.

5. The method of claim 1, wherein said applying Intra-prediction reconstruction applies the Intra-prediction reconstruction to the residue data associated with a prediction unit (PU) to recover the video data associated with the prediction unit, and wherein the transform Skip mode is enabled if the prediction unit and the transform unit having a same size.

6. The method of claim 1, wherein said applying Intra-prediction reconstruction applies the Intra-prediction reconstruction to the residue data associated with a prediction unit (PU) to recover the video data associated with the prediction unit, and wherein the transform Skip mode is enabled if the prediction unit uses an INTRA_NxN partition mode.

7. The method of claim 1, wherein a flag signaling the transform Skip mode is incorporated in a bitstream associated with the video data if the transform Skip mode is enabled.

8. The method of claim 7, wherein the flag is incorporated in a picture level, a slice level or a sequence level of the bitstream.

9. A method for encoding video data, the method comprising:
   receiving video data;
   applying Intra prediction to the video data to form residue data;
   if transform Skip mode is OFF for a transform unit (TU), applying a first encoding process to the residue data associated with the transform unit to generate symbols associated with the transform unit, wherein the first encoding process comprises transform and first scan conversion using a first scan pattern;
   if the transform Skip mode is ON for the transform unit, applying a second encoding process to the residue data to generate the symbols associated with the transform unit, wherein the second encoding process skips the transform and comprises a second scan conversion using a second scan pattern, and wherein the second scan pattern is different from the first scan pattern; and
   applying entropy coding to the symbols to generate compressed data.

10. The method of claim 9, wherein the transform unit corresponds to a 4×4 TU.

11. The method of claim 9, wherein said applying the second encoding process comprises storing the residue data using the second scan pattern before said applying Intra-prediction reconstruction to the residue data.

12. The method of claim 9, wherein said applying Intra prediction applies the Intra prediction to the video data associated with a prediction unit (PU), and wherein the transform Skip mode is enabled if the prediction unit and the transform unit are having a same size.

13. The method of claim 9, wherein said applying Intra prediction applies the Intra prediction to the video data associated with a prediction unit (PU), and wherein the transform Skip mode is enabled if the prediction unit uses an INTRA_NxN partition mode.

14. The method of claim 9, wherein the second scan pattern corresponds to a reverse scan of the first scan pattern.

15. The method of claim 9, wherein a flag signaling the transform Skip mode is incorporated in a bitstream associated with the video data if the transform Skip mode is enabled.

16. The method of claim 15, wherein the flag is incorporated in a picture level, a slice level or a sequence level of the bitstream.

17. An apparatus for decoding video data, the apparatus comprising:
- circuit, wherein the circuit is configured to receive compressed data associated with the video data;
- apply entropy decoding to the compressed data to recover symbols related to a transform unit (TU);
- if transform Skip mode is OFF for the transform unit, apply a first decoding process to the symbols to recover residue data associated with the transform unit, wherein the first decoding process comprises inverse transform and first scan conversion using a first scan pattern;
- if the transform Skip mode is ON for the transform unit, apply a second decoding process to the symbols to recover the residue data associated with the transform unit, wherein the second decoding process skips the inverse transform and comprises a second scan conversion using a second scan pattern, wherein the second scan pattern is different from the first scan pattern; and
- apply Intra-prediction reconstruction to the residue data to recover the video data.

18. An apparatus for encoding video data, the apparatus comprising:
- circuit, wherein the circuit is configured to receive video data;
- apply Intra prediction to the video data to form residue data; if transform Skip mode is OFF for a transform unit, apply a first encoding process to the residue data associated with the transform unit to generate symbols associated with the transform unit, wherein the first encoding process comprises transform and first scan conversion using a first scan pattern;
- if the transform Skip mode is ON for the transform unit, apply a second encoding process to the residue data to generate the symbols associated with the transform unit, wherein the second encoding process skips the transform and comprises a second scan conversion using a second scan pattern, and wherein the second scan pattern is different from the first scan pattern; and
- apply entropy coding to the symbols to generate compressed data.

* * * * *